United States Patent
Pamer

(10) Patent No.: US 9,696,974 B2
(45) Date of Patent: Jul. 4, 2017

(54) GRAPH-BASED MODEL FOR TYPE SYSTEMS

(71) Applicant: MICROSOFT TECHNOLOGY LICENSING LLC., Redmond, WA (US)

(72) Inventor: Joseph J. Pamer, Seattle, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 53 days.

(21) Appl. No.: 13/798,107

(22) Filed: Mar. 13, 2013

(65) Prior Publication Data
US 2014/0282384 A1    Sep. 18, 2014

(51) Int. Cl.
*G06F 9/44* (2006.01)
*G06F 9/45* (2006.01)

(52) U.S. Cl.
CPC .............. *G06F 8/437* (2013.01); *G06F 8/33* (2013.01)

(58) Field of Classification Search
CPC ........ G06F 8/41; G06F 11/3604; G06F 8/427; G06F 8/75; G06F 17/2785; G06F 8/43; G06F 8/436; G06F 8/42; G06F 8/20; G06F 8/30; G06F 8/443; G06F 8/437; G06F 17/24

See application file for complete search history.

(56) References Cited

U.S. PATENT DOCUMENTS

| 5,586,328 | A | 12/1996 | Caron et al. | |
|---|---|---|---|---|
| 5,748,966 | A | 5/1998 | Sato | |
| 6,077,313 | A * | 6/2000 | Ruf | G06F 8/433 717/155 |
| 6,083,282 | A | 7/2000 | Caron et al. | |
| 6,195,792 | B1 * | 2/2001 | Turnbull | G06F 8/437 717/110 |
| 6,360,363 | B1 * | 3/2002 | Moser | G06F 8/67 707/999.202 |

(Continued)

FOREIGN PATENT DOCUMENTS

| EP | 2096534 A1 | 9/2009 |
|---|---|---|
| EP | 2141587 A1 | 1/2010 |

OTHER PUBLICATIONS

Luke Hoban; Announcing TypeScript 0.8.1; Retrieved on Jun. 16, 2014; 3 pages; <http://blogs.msdn.com/b/typescript/archive/2012/11/15/announcing-typescript-0-8-1.aspx>.*

(Continued)

*Primary Examiner* — Thuy Dao
*Assistant Examiner* — Cuong V Luu

(57) ABSTRACT

The type environment of a program can be modeled as a graph. In the graph, a node can represent a code element including but not limited to a function, a class, an object, a variable, an expression, a script, a global, a primitive, a module, an interface, an enumerated list, an array, an alias for a type, a parameter, a property, a type, a method, a function expression, a call signature, an index signature, an object type, or a function type. An edge in the graph can represent a relationship between code elements. When the type of a code element changes, the graph can be changed to model the revised source code. Computations concerning effects of a type change are delayed until information concerning the affected code element is requested.

20 Claims, 6 Drawing Sheets

(56) References Cited

U.S. PATENT DOCUMENTS

| | | | |
|---|---|---|---|
| 6,381,736 B1 | 4/2002 | Klotz et al. | |
| 6,425,124 B1* | 7/2002 | Tominaga | G06F 8/4434 717/146 |
| 6,941,550 B1 | 9/2005 | Sollich | |
| 7,237,226 B2* | 6/2007 | Simonyi | G06F 8/71 717/110 |
| 7,293,261 B1 | 11/2007 | Anderson et al. | |
| 7,350,198 B2 | 3/2008 | Kluger et al. | |
| 7,523,443 B2 | 4/2009 | DeVane | |
| 7,730,448 B2 | 6/2010 | Meijer et al. | |
| 8,122,440 B1 | 2/2012 | Lentini et al. | |
| 8,332,385 B2 | 12/2012 | Moor et al. | |
| 8,713,528 B1* | 4/2014 | Conrad | G06F 11/3608 717/124 |
| 8,713,540 B2* | 4/2014 | de Castillo | G06F 8/51 717/105 |
| 2002/0073398 A1 | 6/2002 | Tinker | |
| 2002/0100033 A1* | 7/2002 | Halstead, Jr. | G06F 8/437 717/162 |
| 2003/0167458 A1* | 9/2003 | Santhanam | G06F 8/41 717/114 |
| 2003/0208605 A1 | 11/2003 | Vu | |
| 2004/0210869 A1 | 10/2004 | DeVane et al. | |
| 2004/0225964 A1* | 11/2004 | Simonyi | 715/530 |
| 2004/0225999 A1 | 11/2004 | Nuss | |
| 2004/0226025 A1* | 11/2004 | Beaudoin | G06F 9/54 719/321 |
| 2005/0273772 A1* | 12/2005 | Matsakis | G06F 8/41 717/136 |
| 2006/0048095 A1* | 3/2006 | Meijer | G06F 8/434 717/114 |
| 2006/0089942 A1 | 4/2006 | Sutter et al. | |
| 2006/0242115 A1 | 10/2006 | Baras et al. | |
| 2006/0259541 A1 | 11/2006 | Bernabeu-Auban et al. | |
| 2007/0011659 A1* | 1/2007 | Venolia | G06F 17/30958 717/127 |
| 2007/0044083 A1 | 2/2007 | Meijer et al. | |
| 2007/0078823 A1 | 4/2007 | Ravindran et al. | |
| 2007/0083551 A1 | 4/2007 | Jezierski et al. | |
| 2007/0245325 A1 | 10/2007 | Lapounov et al. | |
| 2008/0091409 A1 | 4/2008 | Anderson | |
| 2008/0163265 A1* | 7/2008 | Flora | G06F 8/4434 719/328 |
| 2008/0178149 A1 | 7/2008 | Peterson et al. | |
| 2008/0243935 A1 | 10/2008 | Castro et al. | |
| 2008/0244511 A1 | 10/2008 | Chaoweeraprasit et al. | |
| 2008/0262992 A1 | 10/2008 | Meijer et al. | |
| 2008/0282238 A1 | 11/2008 | Meijer et al. | |
| 2009/0187882 A1* | 7/2009 | Jazdzewski | G06F 8/34 717/105 |
| 2009/0313613 A1* | 12/2009 | Ben-Artzi | G06F 8/51 717/137 |
| 2010/0023486 A1 | 1/2010 | Baras et al. | |
| 2010/0088661 A1 | 4/2010 | Langworthy et al. | |
| 2010/0088665 A1* | 4/2010 | Langworthy | G06F 8/75 717/104 |
| 2010/0088674 A1 | 4/2010 | Della-Libera et al. | |
| 2010/0175049 A1 | 7/2010 | Ramsey et al. | |
| 2010/0199257 A1 | 8/2010 | Biggerstaff | |
| 2010/0211924 A1* | 8/2010 | Begel | G06F 8/74 717/101 |
| 2010/0299660 A1 | 11/2010 | Torgersen et al. | |
| 2011/0167404 A1* | 7/2011 | Liu | G06F 8/33 717/106 |
| 2012/0005660 A1 | 1/2012 | Goetz et al. | |
| 2012/0079463 A1* | 3/2012 | Freeman | G06F 8/70 717/137 |
| 2012/0215731 A1 | 8/2012 | Junker | |
| 2014/0025714 A1 | 1/2014 | Reyntjens | |
| 2014/0130016 A1* | 5/2014 | Menghrajani | G06F 8/437 717/124 |
| 2014/0165035 A1* | 6/2014 | Campbell | G06F 8/72 717/121 |

OTHER PUBLICATIONS

Nils Klarlund; Graph Types; 1993 ACM; pp. 196-205; <http://dl.acm.org/citation.cfm?id=158628>.*

Peter Buneman; A Query Language and Optimization Techniques for Unstructured Data; 1996 ACM; pp. 505-516; <http://dl.acm.org/citation.cfm?id=233368>.*

Steven P. Reiss; PECAN Program Development Systems that Support Multiple Views ; 1985 IEEE; pp. 276-285; <http://ieeexplore.ieee.org/stamp/stamp.jsp?arnumber=1702004>.*

Roberto M. Amadio; Subtyping Recursive Types ; 1993 ACM; pp. 575-631; <http://dl.acm.org/citation.cfm?id=155231>.*

Laurie Hendren, Parallelizing Programs with Recursive Data Structures; 1990 IEEE; pp. 35-47; <http://ieeexplore.ieee.org/stamp/stamp.jsp?arnumber=80123>.*

P. Buneman; Programming Constructs for Unstructured Data; 1995 IRCS; 12 pages; <http://repository.upenn.edu/cgi/viewcontent.cgi?article=1123&context=ircs_reports>.*

Randal E. Bryant; Graph-Based Algorithms for Boolean Function Manipulation; 1986 IEEE; pp. 677-691; <http://ieeexplore.ieee.org/stamp/stamp.jsp?arnumber=1676819>.*

Alan L. Davis et al.; Data Flow Program Graphs; 1982 Claremont.edu; 17 pages; <http://scholarship.claremont.edu/hmc_fac_pub/285/>.*

Ralf Hartmut Guting; GraphDB Modeling and Querying Graphs in Databases; 1994 VLDB; 12 pages; <https://pdfs.semanticscholar.org/0f9b/b7d25477862558ba5491c4357e7b8fc65a16.pdf>.*

Haruo Hosoya et al.; Regular Expression Types for XML; 2005 ACM; pp. 46-90; <http://dl.acm.org/citation.cfm?id=1053470&CFID=706243417&CFTOKEN=74449024>.*

Prateek Mishra et al.; Declaration-free Type Checking; 1984 ACM; pp. 7-21; <http://dl.acm.org/citation.cfm?id=318603&CFID=706243417&CFTOKEN=74449024>.*

Evgeny Dantsin et al.; Expressive power and data complexity of nonrecursive query languages for lists and trees; 2000 ACM; pp. 157-165; <http://dl.acm.org/citation.cfm?id=335218&CFID=706243417&CFTOKEN=74449024>.*

Melissa S Cline et al.; Integration of biological networks and gene expression data using Cytoscape; 2007 Nature Protocols; pp. 2366-2382; <http://www.nature.com/nprot/journal/v2/n10/abs/nprot.2007.324.html>.*

John V. Guttag et al.; The Design of Data Type Specifications; 1976 ACM; pp. 414-420; <http://dl.acm.org/citation.cfm?id=807714>.*

John Ellson et al.; Graphviz and Dynagraph Static and Dynamic Graph Drawing Tools; 2004 Springer; pp. 127-147; <http://link.springer.com/chapter/10.1007/978-3-642-18638-7_6>.*

Michael Isard; Dryad Distributed Data-Parallel Programs from Sequential Building Blocks; 2007 ACM; pp. 59-72; <http://dl.acm.org/citation.cfm?id=1273005>.*

Jeffrey Heer et al.; Software Design Patterns for Information Visualization; 2006 IEEE; pp. 853-860; <http://ieeexplore.ieee.org/stamp/stamp.jsp?arnumber=4015439>.*

Andy Schurr; Introduction to Progress an Attribute Graph Grammar Based Specification Language; 1989 Springer; pp. 151-165; <http://link.springer.com/chapter/10.1007/3-540-52292-1_11>.*

"C# Type Inference", Retrieved From <<http://www.codersource.net/MicrosoftNet/CNet30/CTypeInference.aspx>>, Nov. 5, 2012, pp. 1-4.

"Technical Overview", Retrieved From <<<http://www.dartlang.org/docs/technical-overview/>>, Nov. 5, 2012, 6 Pages.

"TypeScript Language Specification"; Retrieved From <<http://docplayer.net/264683-Typescript-language-specification-version-1-4.htrnl>>, Oct. 2012: pp. 1-97.

"Final Rejection Received for U.S. Appl. No. 13/798,088", Mailed Date: Jun. 3, 2016, 19 Pages.

"Final Rejection Received for U.S. Appl. No. 13/798,088", Mailed Date: Mar. 19, 2015, 25 Pages.

"Non Final Rejection Recieved for U.S. Appl. No. 13/798,088", Mailed Date: Aug. 20, 2015. 16 Pages.

"Non Final Rejection Recieved for U.S. Appl. No. 13/798,088", Mailed Date: Jan. 22, 2016. 17 Pages.

"Non Final Rejection Recieved for U.S. Appl. No. 13/798,088", Mailed Date: Nov. 13, 2014, 17 Pages.

(56) References Cited

OTHER PUBLICATIONS

"Non Final Rejection Recieved For U.S. Appl. No. 13/798,088", Mailed Date: Oct. 4, 2016, 19 Pages.
Lindahl, et al., "Practical Type Inference Based on Success Typings", In Proceedings of the 8th ACM SIGPLAN International Conference on Principles and Practice of Declarative Programming. 2006, pp. 167-178.
"Final Rejection Received For U.S. Appl. No. 13/798,095", Mailed Date: Mar. 5, 2015, 27 Pages.
"Final Rejection Received For U.S. Appl. No. 13/798,095", Mailed Date: Dec. 17, 2015, 19 Pages.
"Non Final Rejection Recieved For U.S. Appl. No. 13/798,095", Mailed Date: Aug. 28, 2015, 16 Pages.
"Non Final Rejection Recieved For U.S. Appl. No. 13/798,095", Mailed Date: Oct. 21, 2014, 22 Pages.
"Non Final Rejection Recieved For U.S. Appl. No. 13/798,095", Mailed date: May 25, 2016, 10 Pages.
"Notice of Allowance Received For U.S. Appl. No. 13/798,095", Mailed Date: Sep. 13, 2016, 7 Pages.
"Final Rejection Received For U.S. Appl. No. 13/798,100", Mailed Date: Mar. 17, 2016, 22 Pages.
"Final Rejection Received For U.S. Appl. No. 13/798,100", Mailed Date: Apr. 7, 2015, 27 Pages.
"Non Final Rejection Recieved For U.S. Appl. No. 13/798,100", Mailed Date: Nov. 20, 2015, 22 Pages.
"Non Final Rejection Recieved For U.S. Appl. No. 13/798,100", Mailed Date: Sep. 18, 2014, 26 Pages.
"Non Final Rejection Recieved For U.S. Appl. No. 13/798,100", Mailed Date: Jul. 29, 2016, 22 Pages.
Aiken, et al., "Dynamic Typing and Subtype Inference", In Seventh International Conference on Functional programming Languages and Computer Architecture, Jun. 26, 1995, pp. 182-191.
Esposito, Dino, "C# 4.0, the Dynamic Keyword and COM", Retrieved From <<https://msdn.microsoft.com/en-us/magazine/ff714583.aspx>>, Jun. 2010, 6 Pages.
Gundry, et al., "Type Inference in Context", In Third ACM SIGPLAN workshop on Mathematically Structured Functional Programming, Sep. 27, 2010, pp. 43-54.
Heeren, et al., "Generalizing Hingley-Milner Type Inference Algorithms", In Technical Report, Institute of Information and Computing Sciences, Jul. 8, 2002, pp. 1-28.
"Notice of Allowance Issued in U.S. Appl. No. 13/798,095", Mailed Dated: Dec. 16, 2016, 10 Pages.
"Notice of Allowance Issued in U.S. Appl. No. 13/798,100", Mailed Date: Dec. 30, 2016, 9 Pages.
"Notice of Allowance Issued in U.S. Appl. No. 13/798,100", Mailed Date: Jan. 11, 2017, 10 Pages.
Aiken, et al., "Type Inclusion Constraints and Type Inference", In Proceedings of the Conference on Functional Programming Languages and Computer Architecture, Jun. 9, 1993, pp. 31-41.
Barnes, et al., "On the Principled Design of Object Oriented Programming Languages for High Integrity Systems", In Proceedings of the 2nd NASA/FAA Object Oriented Technology in Aviation Workshop, Jan. 2003, 12 Pages.
Bayne, et al., "Always-Available Static and Dynamic Feedback", In Proceedings of the 33rd International Conference on Software Engineering, May 21, 2011, 10 Pages.
Boyapati, et al., "Ownership Types for Safe Programming Preventing Data Races and Deadlocks", In Proceedings of the 17th ACM SIGPLAN COnference on Object-oriented Programming, Systems, Languages, and Applications, Nov. 4, 2002, pp. 211-230.
Chambers, et al., "Customization Optimizing Compiler Technology for SELF a Dynamically-Typed Object-Oriented Programming Language", In Proceedings of the ACM SIGPLAN Conference on Programming Language Design and Implementation, Jun. 21, 1989, pp. 146-160.
Damas, et al., "Principal Type-Schemes for Functional Programs", In Proceedings of the 9th ACM SIGPLAN-SIGACT Symposium on Principles of programming languages, Jan. 25, 1982, pp. 207-212.
Fritz, Henglein, "Type Inference with Polymorphic Recursion", In ACM Transactions on Programming Languages and Systems. vol. 15, Issue 2, Apr. 1993, pp. 253-289.
Furr, et al., "Static Type Inference for Ruby", In Proceedings of the ACM symposium on Applied Computing, Mar. 8, 2009; pp. 1859-1866.
Haldiman, et al., "Practical, Pluggable Types for a Dynamic Language", In Proceedings of Computer Languages, Systems & Structures; vol. 35, Issue 1, Apr. 2009, 31 Pages.
Huang, et al., "Securing Web Application Code by Static Analysis and Runtime Protection", In Proceedings of the 13th International Conference on World Wide Web, May 17, 2004, pp. 40-51.
Jones, et al., "Simple Unification-based Type Inference for GADTs", In Proceedings of the eleventh ACM SIGPLAN International Conference on Functional Programming, Sep. 16, 2006, pp. 50-61.
Kuo, et al., "Strictness Analysis: A New Perspective Based on Type Inference", In Proceedings of the Fourth International Conference on Functional Programming Languages and Computer Architecture, May 31, 1989, 13 Pages.
Leivant, Daniel, "Polymorphic Type Inference", In Proceedings of the 10th ACM SIGACT-SIGPLAN Symposium on Principles of Programming Languages, Jan. 24, 1983, 11 Pages.
Mitchell, et al., "Coercion and Type Inference", In Proceedings of the 11th ACM SIGACT-SIGPLAN Symposium on Principles of Programming Languages, Jan. 15, 1984, pp. 175-185.
Mitchell, John C., "Polymorphic Type Inference and Containment", In Information and Computation, vol. 76, Issues 2-3, Feb. 1988, pp. 211-249.
Myers, C. Andrew, "JFlow Practical Mostly-Static Information Flow Control", In Proceedings of the 26th ACM SIGPLAN-SIGACT Symposium on Principles of programming languages, Jan. 1, 1999, pp. 228-241.
Necula, et al., "CCured Type-Safe Retrofitting of Legacy Code", In Proceedings of the 29th ACM SIGPLAN-SIGACT Symposium on Principles of Programming Languages, Jan. 16, 2002, pp. 128-139.
Oxhoj, et al., "Making Type Inference Practical", In European Conference on Object-Oriented Programming, Jun. 1992, pp. 329-349.
Paige, et al., "Specification-Driven Development of an Executable Metamodel in Eiffel", In Proceedings of Essentials of the 3rd UML Workshop in Software Mofel Engineering, Jan. 2004, 8 Pages.
Pierce, et al., "Local Type Inference", In CSCI Technical Report 493, Indiana University, Nov. 12, 1997, pp. 1-25.
Saraswat, et al., "Constrained Types for Object-Oriented Languages", In Proceedings of the 23rd ACM SIGPLAN Conference on Object-Oriented Programming Systems Languages and Applications, Oct. 19, 2008, 28 Pages.
Sheard, et al., "Template Meta-Programming for Haskell", In Proceedings of the ACM SIGPLAN Notices, vol. 37, Issue 12, Oct. 3, 2002, 16 Pages.
Wand, Mitchell, "A Simple Algorithm and Proof for Type Inference", In Fundamenta Informaticae, Jan. 1987, 10 Pages.
Wyk, et al., "Adding Syntax and Static Analysis to Libraries via Extensible Compilers and Language Extensions", In Proceedings of Library-Centric Software Design, Oct. 2006, 10 Pages.

* cited by examiner

GRAPH-BASED MODEL FOR TYPE SYSTEMS

CROSS-REFERENCE TO RELATED APPLICATIONS

The application is related in subject matter to co-pending U.S. patent application Ser. No. 13/798,088 entitled "STATIC TYPE CHECKING ACROSS MODULE UNIVERSES", filed on Mar. 13, 2013. The application is related in subject matter to co-pending U.S. patent application Ser. No. 13/798,095 entitled "STATICALLY EXTENSIBLE TYPES", filed on Mar. 13, 2013. The application is related in subject matter to co-pending U.S. patent application Ser. No. 13/798,100 entitled "CONTEXTUAL TYPING", filed on Mar. 13, 2013.

BACKGROUND

One phase of the compilation process for a program written in a statically typed programming language is type checking, in which the compiler validates the correctness of expressions using information collected from type information in the program. This information can be obtained as a result of annotations associated with declarations of code elements, or information deduced by inference. Some compilers can use a code element that has a known type to deduce the type of another code element. This is called type inference.

In a language that features type inference, determining the type of a code element may require knowing the types of all other code elements in a program. This global approach to type inference can result in a computational cost that is quadratic with respect to the total number of declarations of code elements in a program. Any time the source code changes, the potential exists for the type of one or more code elements to change. Each key press may therefore precipitate a type checking operation designed to keep the IDE's understanding of the program's types current. The global approach to type inference can prove to be too computationally expensive in an interactive environment, such as in an IDE (interactive development environment) such as Eclipse or Microsoft's Visual Studio®.

SUMMARY

The type environment of a program can be modeled as a mathematical graph in which units of information in program source code are modeled by nodes in the graph and links or edges between the nodes model relationships between the units of information modeled by the nodes. In the graph, a node can represent a symbol of any element in the source code that can be referenced either syntactically (e.g., it has a name), or semantically (e.g., the call signature of a function). Nodes can represent symbols of code elements including but not limited to a function, a class, an object, a variable, an expression, a script, a global, a primitive, a module, an interface, an enumerated list, an array, an alias for a type, a parameter, a property, a type, a method, a function expression, a call signature, an index signature, an object type, a function type, and so on. A node in the graph can represent a declared code element. A node in the graph can represent an expression bound by an assignment operation to the declaration of the code element. An edge in the graph can represent a relationship between a code element and an expression bound to a declaration of the code element. A relationship represented in the graph can be a "typed as" relationship, a "parent type of" relationship, an "array of type" relationship, a "type dependent upon" relationship, or any other kind of relationship.

When source code is loaded into an editor or IDE and a parse tree is created, information associated with declarations of code elements in the program source code can be stored. Information indicating how the type of the code element was determined can be stored. For example, information indicating that the data type of a particular code element was determined by explicit annotation or information indicating that the data type of the particular code element was determined by type inference can be stored. The parse tree created from the source code may be referenced to compute relationship information.

If the source code is modified, new declaration information can be stored and compared with existing stored declaration information. If type changes have occurred because of the modifications made to the source code, the graph can be correspondingly changed. The graph can be changed to represent the modifications made to types of code elements by breaking one or more links in the graph and creating one or more new links in the graph. The graph can be changed to add new nodes and create one or more links to a new node. Breaking or creating links can change relationships between symbols (e.g., changing the type of a property from number to string can be represented in the graph by breaking the link from the property symbol to the number symbol and creating a link from the property symbol to the string symbol). Computation of new type information can be delayed until a request for the information is received (e.g., the information may be requested directly by, for example, a user hovering over a symbol with a pointing device such as but not limited to a mouse) or indirectly by, for example, another program scanning the code for type errors).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

A type checker that can have a linear response time can be created by modeling the type environment of a program as a mathematical graph, with nodes in the graph representing code elements. Information associated with a modification of type can be displayed in a response time that is linearly related to a number of declarations in the source code. Expressions can be bound to declarations via assignment operations. An example of an expression bound to a declaration can be:

var x=0;

In this statement, "0" is a numeric literal expression, the type of which is "number", enabling the type "number" to be inferred for the variable "x". Edges or links between nodes in the graph can represent relationships between declarations and the expressions bound to the declarations. Relationships include but are not limited to "typed as" or "parent type of" or "array of type" or "type dependent upon", and so on. As program source is loaded into an editor or IDE, information related to declarations of code elements in the source code can be stored in a declarations data store. Information associated with how the type of the code element was determined can also be stored in the declarations data store. For example, type can be determined by explicit annotation, or by type inference.

Declaration and inference information from an abstract syntax tree or parse tree created by a parser can be used to create a directed graph in which a node representing a code element is created and edges or links between the nodes represent relationships between the code elements. When the source code changes in a way that affects a declaration, a second declaration file is created. The first and second declaration files can be compared and the graph can be modified accordingly if type has changed for any code element. For example, if the type of a property "m" is changed from "number" to "string", the link from the property "m" to "number" can be invalidated (broken) and a new link to "string" can be created. Processing the effects of such a change can be delayed until either the user or a program requests information concerning an affected symbol.

Graph-Based Model for Type Systems

Figure 1A:
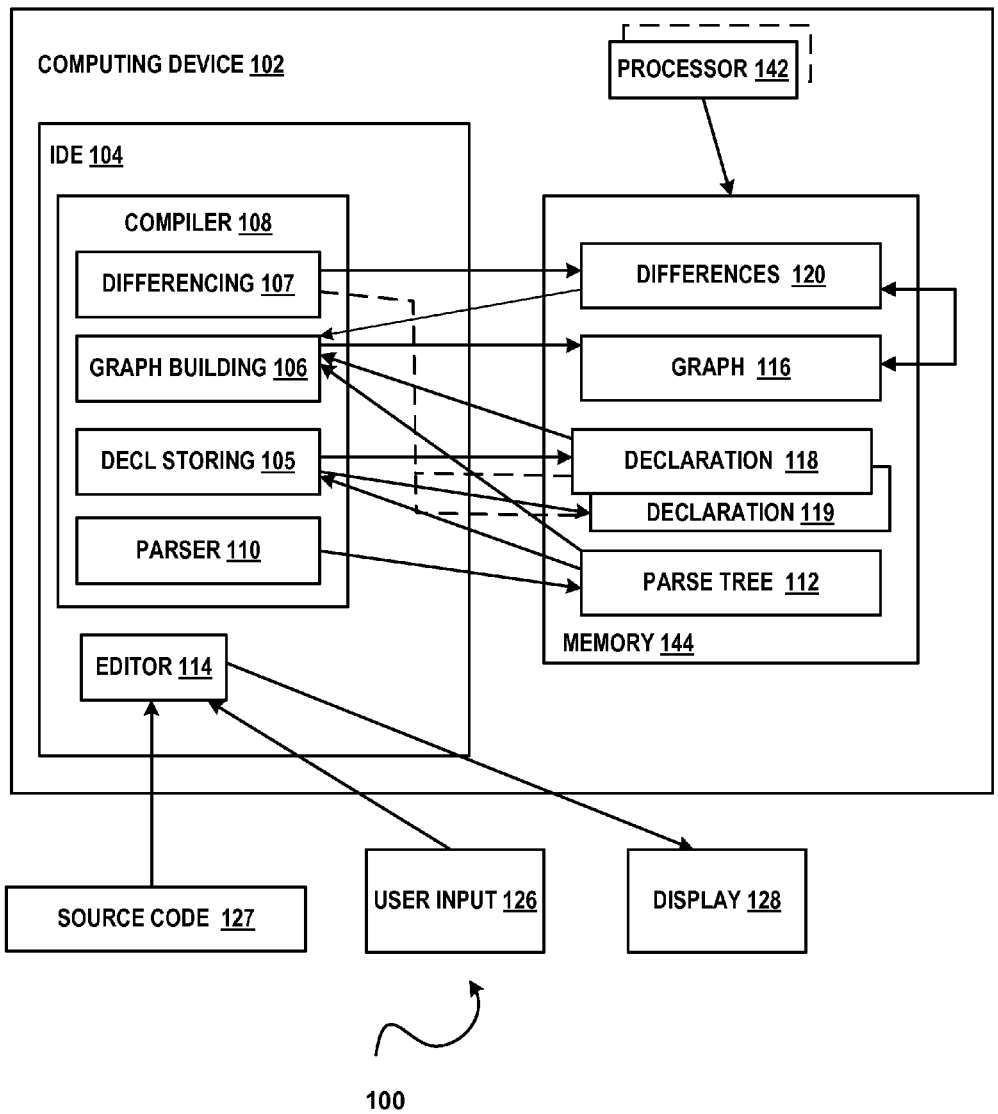
FIG. 1a is a block diagram that illustrates an example of a system 100 that can model a type system in accordance with aspects of the subject matter described herein.

FIG. 1a illustrates a block diagram of an example of a system 100 in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in. System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. System 100 may execute in whole or in part on a software development computer such as the software development computer described with respect to FIG. 4. All or portions of system 100 may be operated upon by program development tools. For example, all or portions of system 100 may execute within an IDE such as for example IDE 104. IDE 104 may be an IDE as described more fully with respect to FIG. 4 or can be another IDE. System 100 can execute wholly or partially outside an IDE.

System 100 can include one or more computing devices such as, for example, computing device 102. A computing device such as computing device 102 can include one or more processors such as processor 142, etc., and a memory such as memory 144 connected to the one or more processors. Computing device 102 can include one or more modules comprising a compiler such as compiler 108. A compiler such as compiler 108 may be a computer program or set of programs that translates text written in a (typically high-level) programming language into another (typically lower-level) computer language (the target language). The output of the compiler may be object code. Typically the output is in a form suitable for processing by other programs (e.g., a linker), but the output may be a human-readable text file. Source code is typically compiled to create an executable program but may be processed by program development tools which may include tools such as editors, beautifiers, static analysis tools, refactoring tools and others that operate in background or foreground.

A compiler 108 may comprise a .NET compiler that compiles source code written in a .NET language to intermediate byte code. .NET languages include but are not limited to C#, C++, F#, J#, JScript.NET, Managed Jscript, IronPython, IronRuby, VBx, VB.NET, Windows PowerShell, A#, Boo, Cobra, Chrome (Object Pascal for .NET, not the Google browser), Component Pascal, IKVM.NET, IronLisp, L#, Lexico, Mondrian, Nemerle, P#, Phalanger, Phrogram, PowerBuilding, #Smalltalk, AVR.NET, Active Oberon, APLNext, Common Larceny, Delphi.NET, Delta Forth .NET, DotLisp, EiffelEnvision, Fortran .NET, Gardens Point Modula-2/CLR, Haskell for .NET, Haskell.net, Hugs for .NET, IronScheme, LOLCode.NET, Mercury on .NET, Net Express, NetCOBOL, OxygenScheme, S#, sml.net, Wildcat Cobol, X# or any other .NET language. Compiler 108 may comprise a JAVA compiler that compiles source code written in JAVA to byte code. Compiler 108 can be any compiler for any programming language including but not limited to Ada, ALGOL, SMALL Machine Algol Like Language, Ateji PX, BASIC, BCPL, C, C++, CLIPPER 5.3, C#, CLEO, CLush, COBOL, Cobra, Common Lisp, Corn, Curl, D, DASL, Delphi, DIBOL, Dylan, dylan.NET, eC (Ecere C), Eiffel, Sather, Ubercode, eLisp Emacs Lisp, Erlang, Factor, Fancy, Formula One, Forth, Fortran, Go, Groovy, Haskell, Harbour, Java, JOVIAL, LabVIEW, Nemerle, Obix, Objective-C, Pascal, Plus, ppC++, RPG, Scheme, Smalltalk, ML, Standard ML, Alice, OCaml, Turing, Urq, Vala, Visual Basic, Visual FoxPro, Visual Prostore, WinDev, X++, XL, and/or Z++. Compiler 108 can be a compiler for any typed programming language.

A compiler such as compiler 108 and/or program development tools are likely to perform at least some of the following operations: preprocessing, lexical analysis, parsing (syntax analysis), semantic analysis, code generation, and code optimization. Compiler 108 may include one or more modules comprising a parser such as parser 110 that receives program source code and generates a parse tree such as parse tree 112. Parser 110 can be a background parser, parallel parser or incremental parser. Parser 110 can be a pre-processor, or a plug-in or add-in or an extension to an IDE, parser, compiler or pre-processor. Parser 110 can include a syntax analyzer that may perform syntax analysis. Syntax analysis involves parsing a token sequence to identify the syntactic structure of the program. The syntax analysis phase typically builds a parse tree such as, for example, parse tree 112. A parse tree replaces the linear sequence of tokens in the program source code with a tree structure built according to the rules of a formal grammar which define the syntax of the programming language. The parse tree is often analyzed, augmented, and transformed by later phases in the compiler. Compiler 108 may also include a code generator (not shown) that receives a parse tree and generates an executable (not shown). Compiler 108 may also include other components known in the art.

System 100 can include one or more modules such as declaration storing module 105 that creates one or more stores of declarations such as declaration store 118 and declaration store 119. Declaration storing module 105 can receive a parse tree such as parse tree 112 created by the parser 110 and can create a data store of declarations such as declaration store 118 from the parse tree 112. Declaration store 118 can include an identifier of a code element, a type of the code element and how the type of the code element was determined (e.g., by explicit annotation, by inference, and so on). Declaration storing module 105 can be a part of compiler 108, as illustrated in FIG. 1a or can be a separate entity, plug-in, or add-on (not shown). Declaration storing module 105 can be a part of a parser (not shown). It will be appreciated that declaration storing module 105 can be loaded into memory 144 to cause one or more processors such as processor 142, etc. to perform the actions attributed to the one or more modules comprising a declaration storing module represented in FIG. 1a by declaration storing module 105.

System 100 can include one or more modules such as graph building module 106 that builds a graph that models a type system as described herein. Graph building module 106 can receive information concerning declarations in source code such as declaration store 118 and a parse tree such as parse tree 112 and create therefrom a graph such as graph 116. Graph building module 106 can construct the nodes of the graph from the declaration store 118. Graph-building module 106 can create links between the nodes in a type resolution phase. Links between the nodes can represent relationships between the symbols represented by the nodes.

Relationships can be represented in graph 116 by edges between nodes. Relationships represented in the graph 116 can include but are not limited to the following relationships: typed as, contextually typed, provides inferred type, array type, array of, instance type, public member, private member, static member, alias, contained by, extends, implements, interface a implements interface b, parameter type for a function, return type for a function, call a construct and index signature. Some links between nodes can be created as the nodes are constructed because certain information is known immediately. Examples include but are not limited to members of a class. Graph building module 106 can be a part of compiler 108, as illustrated in FIG. 1a or can be a separate entity, plug-in, or add-on (not shown). Graph building module 106 can be a part of a parser (not shown). It will be appreciated that graph building module 106 can be loaded into memory 144 to cause one or more processors such as processor 142, etc. to perform the actions attributed to the one or more modules comprising a graph building module represented in FIG. 1a by graph building module 106.

System 100 can include one or more modules such as differencing module 107 that compares declarations. For example, differencing module 107 can compare declarations in a first declaration store such as declaration store 118 and a second declaration store such as declaration store 119.

Declaration store 118 can be a declaration data store that was generated from the source code loaded into the programming environment. Declaration store 118 can be a declaration data store that was generated from a previous version of source code. Declaration store 119 can be a declaration data store that was generated in response to changes made to the source code, e.g., in an interactive editing session.

Differences between declaration store 118 and declaration store 119 can be stored in a differences data store such as differences store 120. Differences between declaration store 118 and declaration store 119 can represent changes to the type of one or more code elements. If the changes to the source code do not affect type, differences store 120 can be empty or null. Differencing module 107 can be a part of compiler 108, as illustrated in FIG. 1a or can be a separate entity, plug-in, or add-on (not shown). Differencing module 107 can be a part of a parser (not shown). It will be appreciated that differencing module 107 can be loaded into memory 144 to cause one or more processors such as processor 142, etc. to perform the actions attributed to the one or more modules comprising a differencing module represented in FIG. 1a by differencing module 107.

In response to receiving the differences store 120 graph 116 can be modified by graph building module 106. In response to the detection of changes to the type of code elements in the differences store 120, graph building module 106 may invalidate existing links in the graph based on the changes to the types of one or more code elements. In response to the detection of differences in declarations, graph building module 106 may create new links in the graph based on the differences. In response to detection of differences in declarations, new nodes can be created in graph 116. Links may be created to new nodes in graph 116 in response to the detection of differences in declarations. In response to an empty or null differences store 120, in accordance with some aspects of the subject matter described herein, no changes are made to the graph 116. System 100 can include any combination of one or more of the following: an editor such as but not limited to editor 114, a display device such as display device 128, and so on. Editor 114 can receive source code such as source code 127 and user input such as user input 126. Results of editing operations, type information and so on can be displayed on display device 128. Computation of results of changes in types to code elements may be delayed until, for example, a user hovers over a symbol with a pointing device or until another program scans the code for type errors. Other components well known in the arts may also be included but are not here shown.

Source code 127 can be TypeScript source code that is compiled into JavaScript code. Typescript is a superset of JavaScript, meaning that any valid JavaScript code is valid TypeScript code. TypeScript adds additional features on top of JavaScript. TypeScript can be converted into ECMAScript 5 compatible code by the TypeScript compiler, a different approach than that taken by other known compile-to-JavaScript languages. TypeScript permits the annotation of variables, function arguments, and functions with type information, facilitating the use of tools such as auto-completion tools and enabling more comprehensive error checking than that provided by using traditional JavaScript.

Source code 127 can be source code in any statically typed programming language. Source code such as source code 127 can be loaded into an editor such as editor 114. Source code can be provided by user input such as user input 126. Source code 127 can be modified by user input 126. Source code 127 can include type declarations. The declarations can be explicitly annotated with type information. For example, in the static programming language TypeScript the following code:

var x: number;

declares a variable "x" that is explicitly annotated to be of type "number". In programming languages that support inference, type can be inferred. For example, in the TypeScript code var x=0;

variable "x" can be inferred to be of type "number" from the type of the assignment expression: because "0" is a number, variable "x" is inferred to be a number. Similarly, in the TypeScript code:

var y=0;
    var x=y;

variable "x" can be inferred to be of type number because variable "x" is set to variable "y" and variable "y" is inferred to be of type "number" because "0" is a number. In the statement:

var x: number=0;

variable "x" is explicitly declared to be of type "number" and is assigned the value "0". In accordance with some aspects of the subject matter described herein, in the presence of both an explicit annotation ("x: number") and an assignment statement, "x=0", the assignment statement is overridden by the explicit annotation. Thus in the statement above, the assignment is not used to infer type because the annotation declares the type explicitly.

User input such as user input 126 can be changes made to source code 127. The source code and program development information provided by tools of the IDE can be displayed on display device 128.

When source code 127 is loaded into an editor such as editor 114, parser 110 can parse the source code 127. A parse tree 112 can be created. Declaration storing module 105 can receive the parse tree 112 and can create a store of declarations in a declaration data store such as declaration data store 118. Declaration store 118 and parse tree 112 can be received by graph building module 106. Graph building module 106 can create a graph 116. User input 126 modifying source code 127 can be received. Parser 110 can modify the parse tree 112 to represent the updated source code. Module 105 can collect updated declaration information from the updated parse tree 112 in a declarations store such as declarations store 119. Differencing module 107 can compare the previous declaration store 118 with the updated declaration store 119. Differences can be ascertained and stored in a differences data store 120. Graph building module 106 can receive the differences stored in the differences data store 120 and can update the graph 116 to reflect the changes to the types of the code elements of the source code. If the changes made to the source code 127 do not affect the type of any of the code elements of the source code, no differences will be detected in the different declaration files and the graph will not be modified.

Figure 1B:
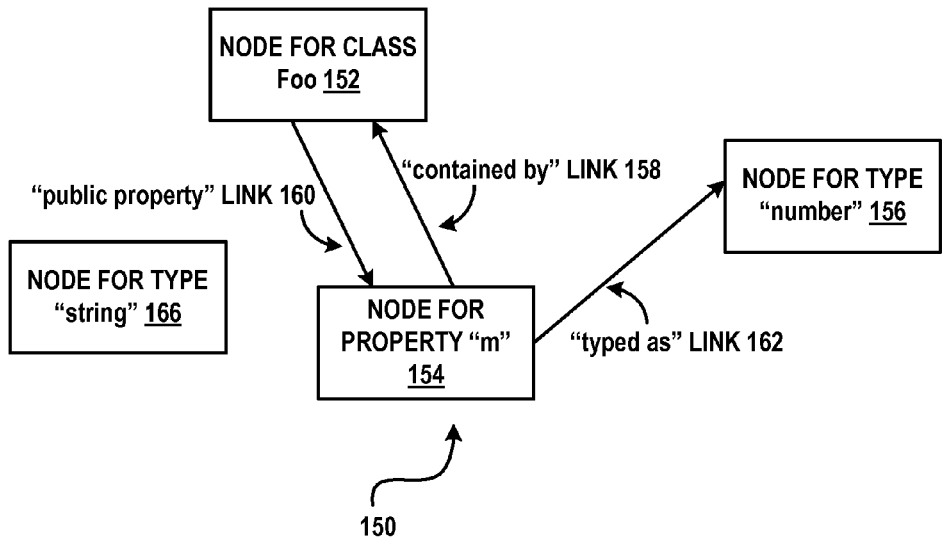
FIG. 1b is a block diagram that illustrates an example of a graph that models a type system in accordance with aspects of the subject matter described herein.

FIG. 1b is a block diagram that illustrates an example of a graph that models a type system in accordance with aspects of the subject matter described herein. Suppose the following source code is received:

class Foo{
        public m:number;
    }

The code appearing above defines a class Foo. Class Foo is public and has a property "m" which is of type "number".

FIG. 1b illustrates a graph 150 that models the type system of the source code fragment above.

Graph building module 106 can create a node such as node 152 that represents a symbol for class Foo, and a node such as node 154 that represents a symbol for property "m". A node such as node 156 that represents a symbol for the "number" type may already exist because the "number" type is a global concept. Similarly, a node such as node 166 that represents a symbol for the "string" type may already exist because the "string" type is a global concept. Graph building module 106 can compute relationships between the nodes and can create links between the nodes. For example, because "m" is a member of the class "Foo", a directional "contained by" link 158 can be established between starting node 154 and ending node 152. Because m is defined as public, a directional "public property" link 160 can be established from starting node 152 for class "Foo" to ending node 154 for property "m". A directional "typed as" link 162 can be established between starting node 154 for property "m" to ending node 156 for type "number".

Now suppose in an interactive editing session, the above code fragment is changed to:

class Foo{
        public m:string;
    }

Figure 1C:
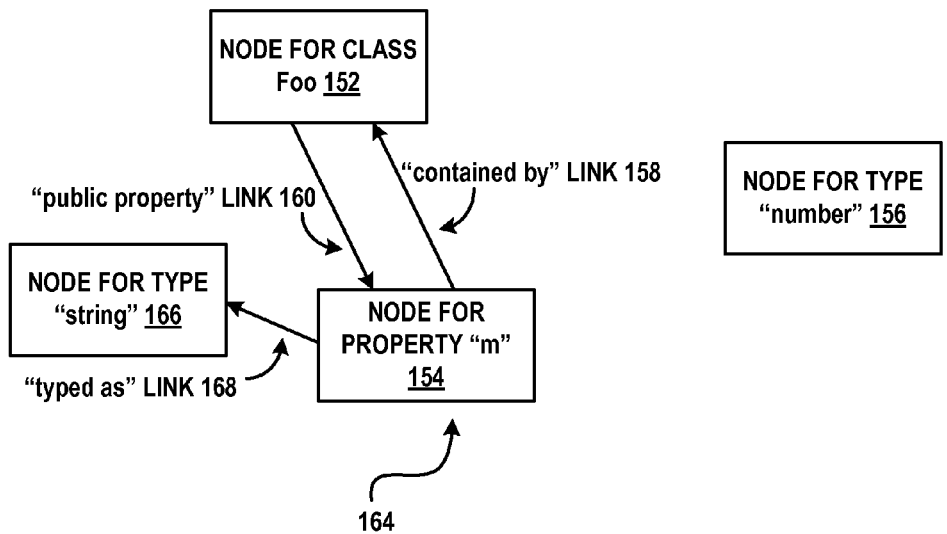
FIG. 1c is a block diagram that illustrates another example of a graph that models a type change resulting from a source code change in accordance with aspects of the subject matter described herein.

FIG. 1c illustrates the changes that are made to graph 150 in response to changing the type of property "m". FIG. 1c illustrates a graph 164 that models the type system of the code fragment above in which the type of "m" has been changed from "number" to "string". In FIG. 1c link 162 is invalidated (broken) and a new directional "typed as" link 168 is created between starting node 154 for property "m" to ending node 166 for type "string".

Figure 1D:
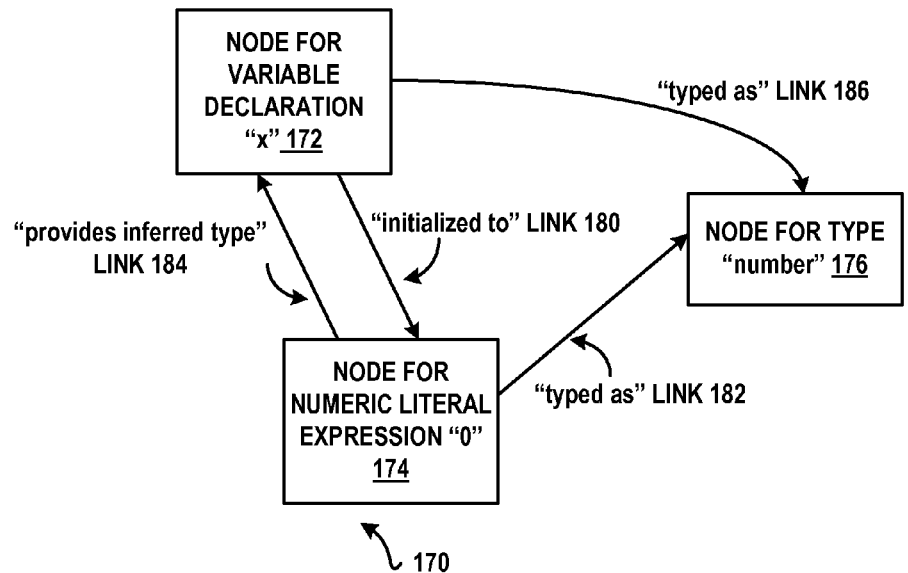
FIG. 1d is a block diagram that illustrates another example of a graph that models a type system in accordance with aspects of the subject matter described herein.

FIG. 1d illustrates an example of a graph 170 resulting from the source code:

var x=0;

which is an example of an expression bound to a declaration. In this statement, "0" is a numeric literal expression, the type of which is a "number", enabling the type "number" to be inferred for the value "x". Nodes for the following are created: a symbol for variable declaration "x", node 172, a node for a symbol for the numeric literal expression "0", node 174, and a node for a symbol for "number" node 176. An edge representing the relationship "initialized to", link 180 can be created between node 172 (the node representing the symbol for variable declaration "x") and node 174, the node representing the symbol for the numeric literal expression "0". An edge representing the relationship "typed as", link 182 can be created between node 174, the node representing the symbol for the numeric literal expression "0" and node 176, the node representing the symbol for the type "number". An edge representing the relationship "provides inferred type", link 184, can be created between node 174, the node representing the symbol for the numeric literal expression "0" and node 172, the node representing the symbol for variable declaration "x".

Figure 1E:
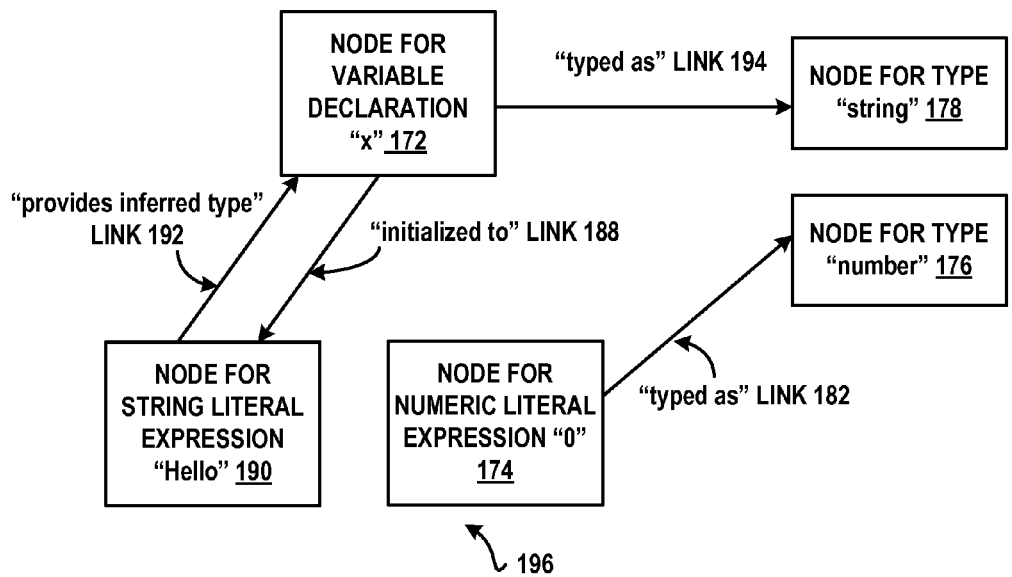
FIG. 1e is a block diagram that illustrates another example of a graph that models a type change resulting from a source code change in accordance with aspects of the subject matter described herein.

Link 184 provides the ability to determine by examining the graph that variable "x" is inferred to be of type "number" and to change the type of variable "x" if the declaration statement changes. Suppose, for example, the declaration of variable "x" is changed, from:

var x=0;

to:

var x="Hello";

FIG. 1e illustrates a graph 196 that can be created as a result of the change of the declaration of variable "x". Referring now concurrently to FIG. 1e and FIG. 1f, the "initialized to" link, link 180, from node 172 representing the symbol for variable declaration "x" to node 174 representing the symbol for the numeric literal expression "0" shown in FIG. 1d can be broken and a new link ("initialized to" link 188) can be created from to node 172 representing the symbol for variable declaration "x" to a new node 190 representing a symbol for the string literal expression "Hello" shown in FIG. 1e.

The "provides inferred type" link 184 in FIG. 1d from node 174 representing the symbol for the numeric literal expression "0" to node 172 representing the symbol for variable declaration "x" can be broken and a new "provides inferred type" link 192 can be created from the new node 190 representing the symbol for the string literal expression "Hello" to node 172 representing the symbol for variable declaration "x" shown in FIG. 1e. The "typed as" link 186 shown in FIG. 1d from node 172 representing the symbol for variable declaration "x" to node 176, the node representing the symbol for "number" can be broken. Using the "provides inferred type" link 192 shown in FIG. 1e a new "typed as" link 194 from node 172 representing the symbol for variable declaration "x" to a node 178 representing a symbol for type "string" can be created as shown in FIG. 1e.

Figure 2:
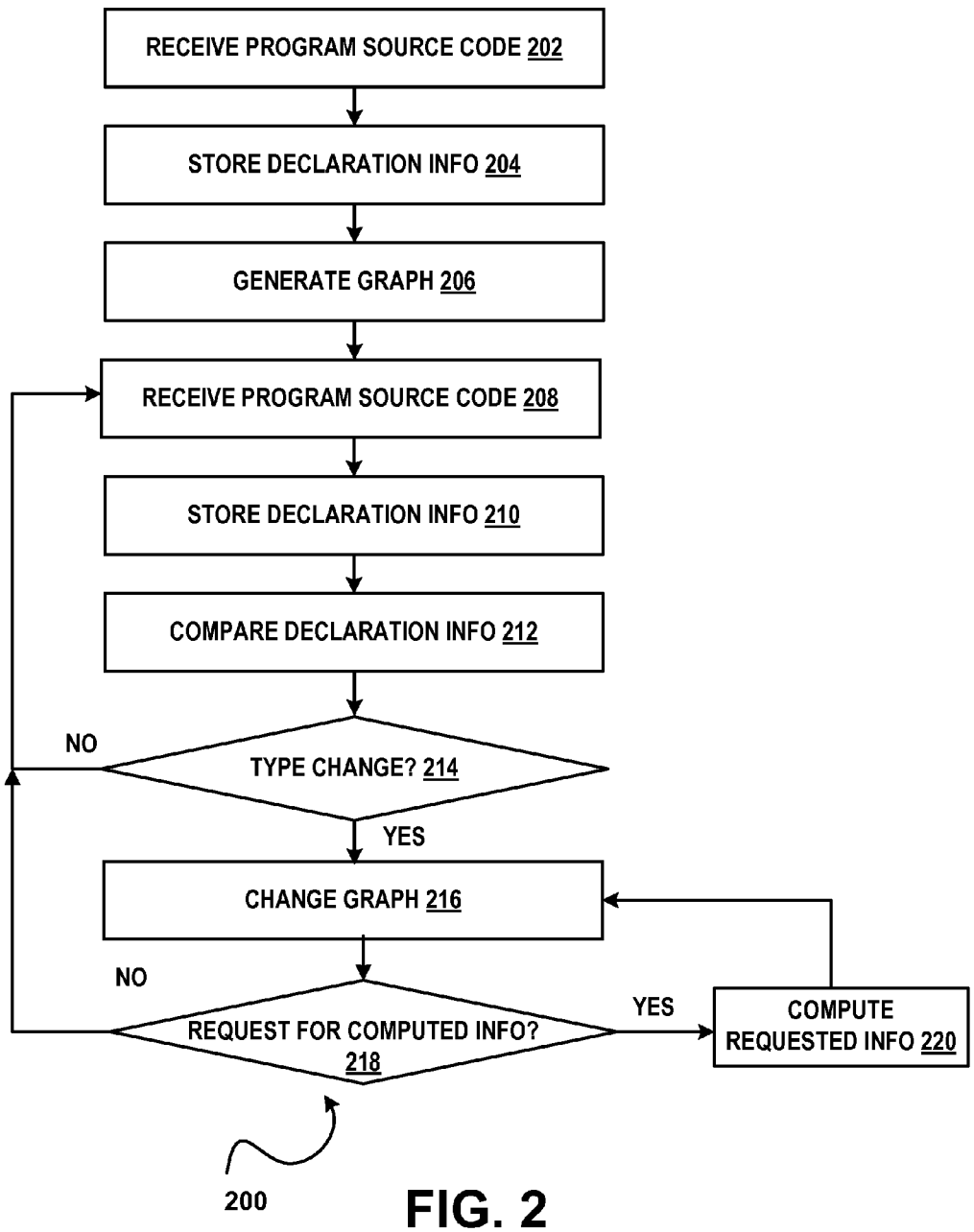
FIG. 2 is a flow diagram that illustrates an example of a method 200 that can model a type system in accordance with aspects of the subject matter disclosed herein.

FIG. 2 illustrates an example of a graph-based method of modeling a type system in accordance with aspects of the subject matter disclosed herein. The method 200 described in FIG. 2 can be practiced by a system such as but not limited to the one described with respect to FIG. 1a. While method 200 describes a series of operations that are performed in a sequence, it is to be understood that method 200 is not limited by the order of the sequence. For instance, some operations may occur in a different order than that described. In addition, one operation may occur concurrently with another operation. In some instances, not all operations described are performed.

At operation 202 source code is received. Source code can be loaded into an IDE. Source code can be loaded into a program editor. A parse tree may be generated from the source code. At operation 204, type information can be stored. Type information can be obtained from the parse tree created from the source code. Alternatively, type information can be obtained directly from the source code. Type information may come from explicit annotations in declarations of code elements in the source code. Type information can be inferred from information obtained from the source code. Type information can be stored from declarations in the parse tree. At 206 a graph that models the type information of code elements in the source code can be created. The graph may be created directly from the source code, from the parse tree, from the type information obtained from declarations of code elements in the source code or any combination thereof.

At 208 revised program source code can be received. A revised parse tree may be generated from the revised source code. Revised type information may be stored at operation 210. Type information can be obtained from the revised parse tree created from the revised source code. At operation 212 type information from the original type information store can be compared to type information from the revised type information store. At operation 214 the comparison can be examined to determine if the revisions to the source code have changed the type of any code elements. In response to determining that the type of code elements have not been affected by the revisions to the source code, processing can return to operation 208.

At operation 214 in response to determining that the revisions to the source code have affected the type of at least one code element the graph modeling the type system of the program can be changed at operation 216. Links between code elements can be invalidated. New links can be created. New nodes can be created. At operation 218, if a request for information affected by the revision is received, the new information can be computed at operation 220. The computed information can be displayed on a display device. If no request for information is requested, processing can return to operation 208.

Example of a Suitable Computing Environment

Figure 3:
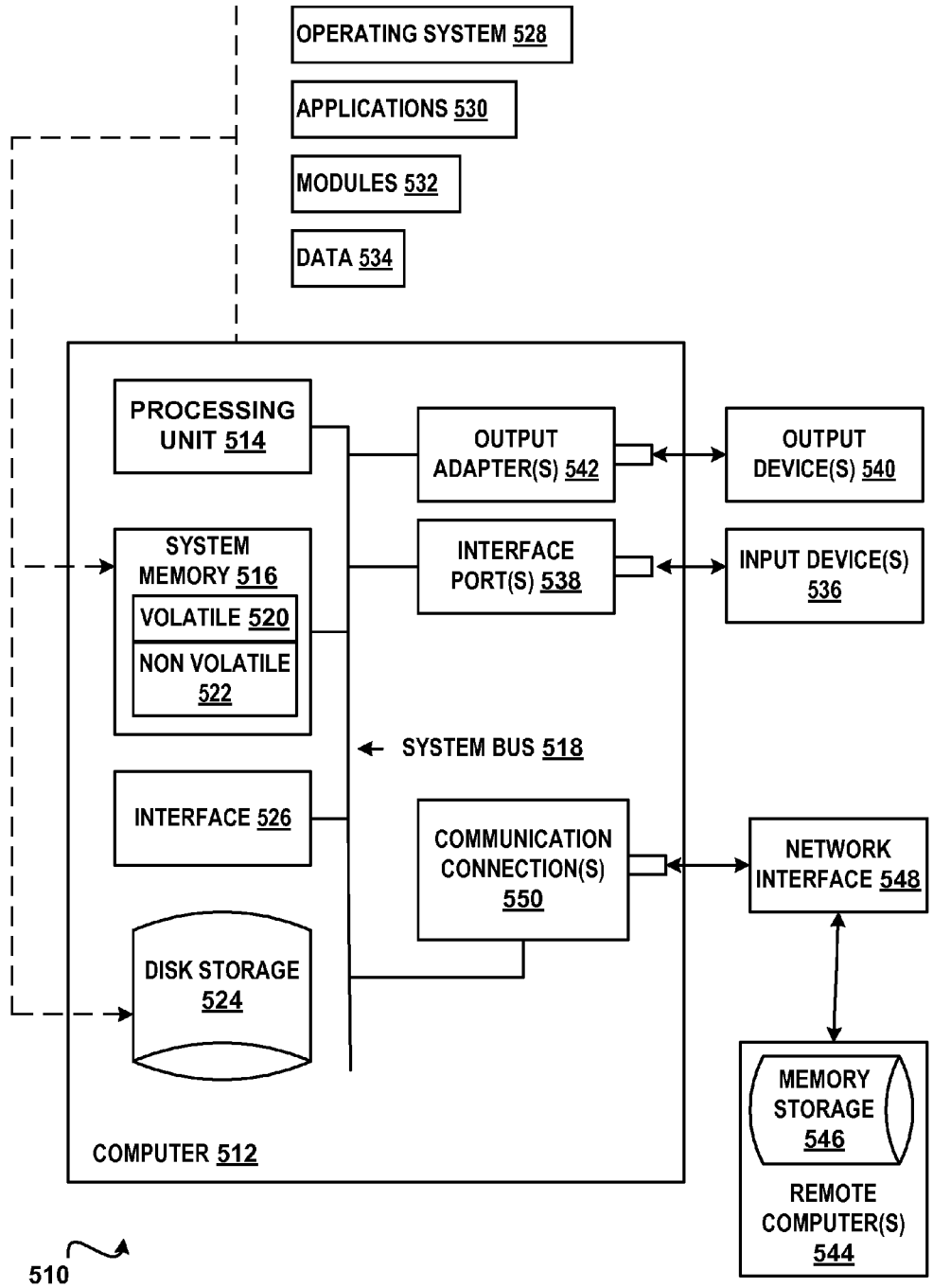
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
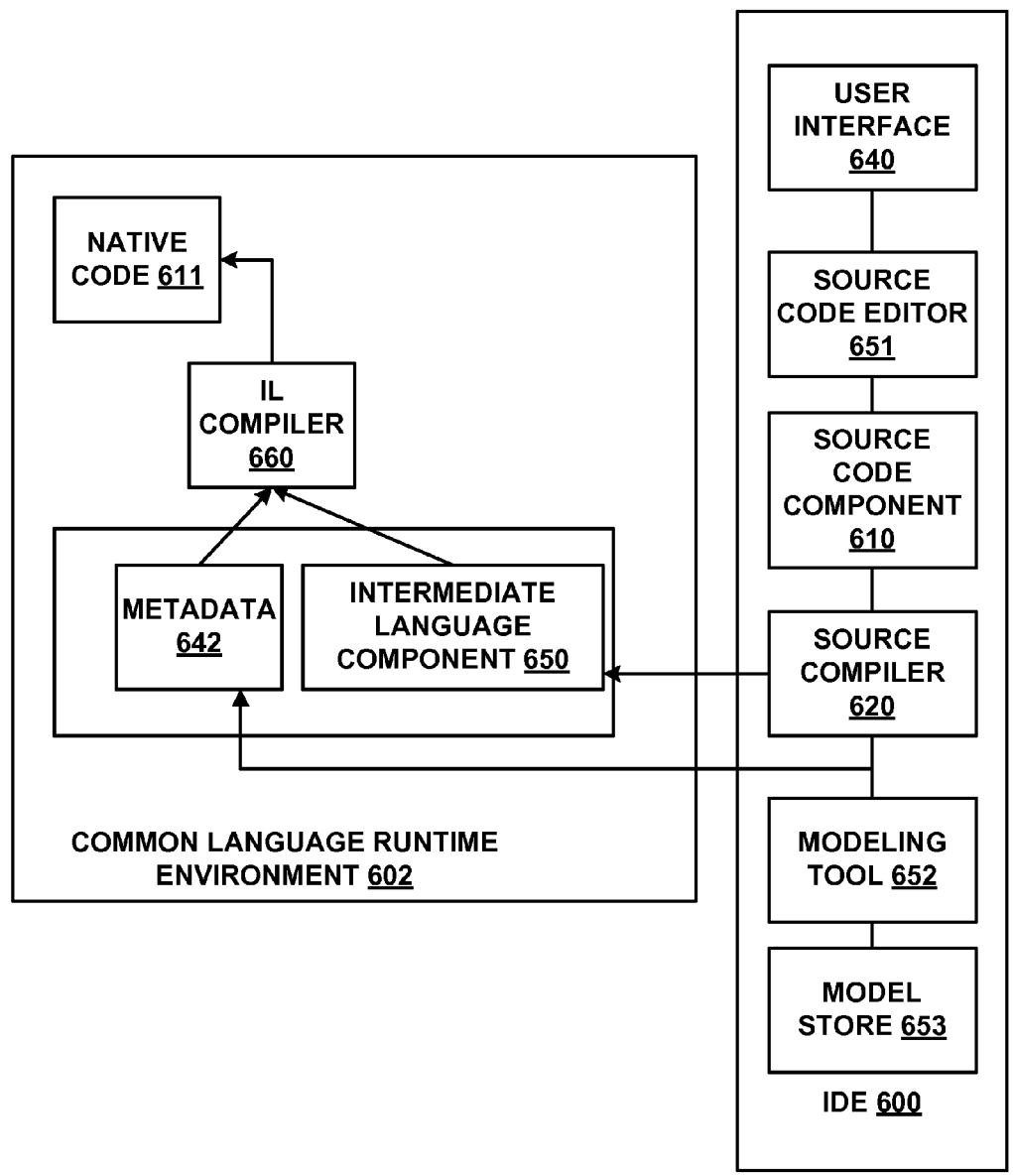
FIG. 4 is a block diagram of an example of an integrated development environment (IDE) in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the Microsoft .NET™ framework. An intermediate language component 650 may be created from the source code component 610 and the native code component 611 using a language specific source compiler 620 using a modeling tool 652 and model store 653 and the native code component 611 (e.g., machine executable instructions) is created from the intermediate language component 650 using the intermediate language compiler 660 (e.g. just-in-time (JIT) compiler), when the application is executed. That is, when an intermediate language (IL) application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   in response to receiving source code of a program by a processor of a computing device, creating a graph modeling a type system of the program, the graph comprising a plurality of nodes representing code elements and at least one link of a plurality of links representing a relationship between a code element and an expression bound to a declaration of the code element; and
   modifying the graph in response to detecting a modification of the source code in an editing session, the modification of the source code changing a data type of at least one code element represented by a node of the plurality of nodes in the graph.

2. The method of claim 1, further comprising:
   modifying the graph by invalidating at least one link and creating at least one link.

3. The method of claim 1, further comprising:
   delaying computation of consequences of changing the data type of the at least one code element until a request for information associated with the computation is received.

4. The method of claim 1, wherein a relationship comprises one of: typed as, contextually typed, provides inferred type, array type, array of, instance type, public member, private member, static member, alias, contained by, extends, implements, interface a implements interface b, parameter type for a function, return type for a function, call a construct or index signature.

5. The method of claim 1, further comprising:
   comparing a first data store of type information associated with the source code of the program with a second data store of type information associated with a revision to the source code to determine if the revision changed the data type of the at least one code element.

6. The method of claim 1, further comprising:
   creating a data store of type information from a parse tree created from the source code.

7. A system comprising:
   at least one processor:
   a memory connected to the at least one processor; and
   at least one module that when loaded into the memory causes the at least one processor to:
   detect a change in program source code during an interactive editing session when the change changes a data type associated with a first code element, the change affecting a data type associated with a second code element;
   delay computation of an effect of the change in the data type associated with the first code element on the second code element until a request for the data type of the second code element is received; and
   in response to detecting a request for information associated with the data type of the second code element, display information on how the data type of the second code element was determined.

8. The system of claim 7, further comprising:
   at least one module comprising a graph building module that when loaded into a memory causes the at least one processor to:
   build a graph in the memory, the graph modeling a type system of a program by:
     creating a first node in the graph, the first node representing a symbol for the first code element; and
     creating a link from the first node to a second node representing a symbol for a data type, the link representing a "typed as" relationship between the first node and the second node; and
   in response to detecting a change in the data type associated with the first code element, the change comprising a change in the data type of the first code element from a first data type to a second data type, invalidating the link from the first node to the second node and creating a link from the first node to a third node representing a symbol for the second data type.

9. The system of claim 8, further comprising:
   a module that when loaded into the memory causes the at least one processor to:
   in response to loading source code into an editor, create a first data store of data type information, the data type information comprising at least one code element and a data type of the at least one code element.

10. The system of claim 9, further comprising:
    a module that when loaded into the memory causes the at least one processor to:
    in response to editing the source code, create a second data store of data type information, the second data store of data type information comprising the at least one code element and a revised data type of the at least one code element.

11. The system of claim 10, further comprising:
    a module that when loaded into the memory causes the at least one processor to:
    compare the first data store and the second data store to detect a change in data type of the at least one code element; and
    in response to detecting the change in data type of the at least one code element, change the graph modeling the type system of the program to model the edited source code.

12. The system of claim 11, wherein at least one link in the graph is invalidated and at least one link in the graph is created.

13. The system of claim 7, wherein a code element comprises one of: a function, a class, an object, a variable, an expression, a script, a global, a primitive, a module, an interface, an enumerated list, an array, an alias for a type, a parameter, a property, a type, a method, a function expression, a call signature, an index signature, an object type, or a function type.

14. A device comprising:
at least one processor and a memory;
the at least one processor configured to:
in response to receiving source code of a program, create a graph modeling a type system of the program, the graph comprising a plurality of nodes representing symbols of code elements and a plurality of links representing relationships between the code elements and expressions bound to a declaration of the code elements;
modify the graph in response to detecting a modification of the source code in a source code editor, the modification of the source code changing a data type of at least one code element represented by a node of the plurality of nodes in the graph by invalidating at least one link and creating at least one link; and
display information associated with the modification in a response time that is linearly related to a number of declarations in the source code.

15. The device of claim 14, wherein the at least one processor is further configured to:
create a data store of type information from a parse tree created from the source code.

16. The device of claim 14, wherein the at least one processor is further configured to:
compare a first data store of type information associated with the source code and a second data store of type information associated with a revision to the source code to determine if a type change has occurred.

17. The device of claim 14, wherein the at least one processor is further configured to:
compute an effect on a second code element of changing the data type of the at least one code element in response to a request for type information of the second code element.

18. The device of claim 14, wherein the at least one processor is further configured to:
receive TypeScript program source code.

19. The device of claim 14, wherein the at least one processor is further configured to:
create a link representing a relationship comprising one of typed as, contextually typed, provides inferred type, array type, array of, instance type, public member, private member, static member, alias, contained by, extends, implements, interface a implements interface b, parameter type for a function, return type for a function, call a construct or index signature.

20. The device of claim 14, wherein the at least one processor is further configured to:
create a node comprising a code element, the code element comprising one of:
a function, a class, an object, a variable, an expression, a script, a global, a primitive, a module, an interface, an enumerated list, an array, an alias for a type, a parameter, a property, a type, a method, a function expression, a call signature, an index signature, an object type, or a function type.

* * * * *